UNITED STATES PATENT OFFICE.

FRANCIS ELLERSHAUSEN, OF LONDON, ENGLAND.

PROCESS OF TREATING REFRACTORY SULFID ORES.

SPECIFICATION forming part of Letters Patent No. 635,093, dated October 17, 1899.

Application filed November 21, 1898. Serial No. 697,070. (No specimens.)

*To all whom it may concern:*

Be it known that I, FRANCIS ELLERSHAUSEN, a subject of the Queen of Great Britain, residing at London, England, have invented new and useful Improvements in the Treatment of Refractory Sulfid Ores, (for which I have applied for a patent in Great Britain, No. 15,645, dated July 16, 1898;) and I do hereby declare that the following is a full, clear, and exact description of the invention, which will enable others skilled in the art to which it appertains to make and use the same.

This invention consists in an improved process of treating refractory sulfid ores containing lead, zinc, and silver, whereby the said ores are smelted in an ordinary blast-furnace without previous roasting and leaching and practically all the metals are obtained.

My invention is fully disclosed in the following description and claims.

In the reduction of refractory sulfid ores containing, among other metals, lead, zinc, and silver it is customary to first roast and leach the ore and then to treat it in a metallurgical furnace. Attempts have been made to smelt this class of ores in a raw or unroasted condition; but so far as I am aware all such attempts have been unsuccessful. In experimenting with the smelting of these ores without previous roasting and leaching I have found that the cause of the previous failures is that the zinc forms accretions in the furnaces and in a short time they become choked and stop the operation of smelting. I have found by experiment that I can successfully smelt these ores in an ordinary cupola-furnace, such as is used for lead-smelting, by using in addition to the ordinary blast an exhaust for withdrawing the fumes from the ores so rapidly and with such force as to prevent the formation of zinc accretions in the furnace.

In carrying out my invention the raw ore (not previously roasted and leached) is placed in a cupola-furnace of the ordinary type above referred to and an exhaust is connected to the downcast of the cupola sufficiently powerful to withdraw the fumes and gases with such rapidity and force as to positively prevent the formation of zinc accretions. I have found that when I use an exhaust of this power I have no trouble in smelting these ores in a raw condition with the ordinary amount of fluxes and fuel.

I am aware that fans or their equivalents have been employed to draw off fumes from furnaces of many kinds prior to the date of my application, and I make no claim to the use of an exhaust of this kind and for this purpose *per se;* but I claim to be the inventor of the process of smelting refractory sulfid ores containing, among other metals, lead and zinc without previous roasting and leaching by the use of an ordinary blast in connection with an exhaust for drawing off the fumes or gases sufficiently powerful to prevent the formation of zinc accretions. The gases (sulfurous acid, lead and zinc fumes, &c.) drawn off by the powerful exhaust are condensed, collected, and separated by any of the well-known methods.

Vast quantities of ores of this kind herein referred to are in existence which cannot be economically treated on a commercial scale by the ordinary method of reduction above referred to, but which can be economically and successfully treated for the extraction of the metals contained therein by my process, which is much less expensive than the ordinary method, which requires the ores to be roasted, leached, and smelted in a metallurgical furnace, and by my process the reduction of this class of ores is greatly simplified and cheapened, as will be readily understood by those skilled in the art.

What I claim, and desire to secure by Letters Patent, is—

1. The herein-described process of treating refractory sulfid ores containing lead and zinc, which consists in smelting the raw ores, without previous treatment and positively drawing off the fumes and gases by means of an exhaust sufficiently powerful to prevent the formation of zinc accretions, substantially as described.

2. The herein-described process of treating refractory sulfid ores containing lead and zinc which consists in smelting the raw ores, without previous roasting and leaching, in an ordinary blast-furnace, and positively drawing off the fumes and gases by means of an exhaust sufficiently powerful to prevent the formation of zinc accretions in the furnace, substantially as described.

FRANCIS ELLERSHAUSEN.

Witnesses:
G. F. REDFERN,
JOHN E. BOUSFIELD.